US008689840B2

(12) United States Patent
Yang et al.

(10) Patent No.: US 8,689,840 B2
(45) Date of Patent: Apr. 8, 2014

(54) FRAGMENTATION OF AGGLOMERATED FINE SOLIDS

(75) Inventors: Yongyong Yang, Shanghai (CN); Ang Zhao, Shanghai (CN); Shinichi Suzuki, Chiba (JP); Xiaohai Gong, Shenyang (CN)

(73) Assignee: Dow Global Technologies LLC, Midland, MI (US)

( * ) Notice: Subject to any disclaimer, the term of this patent is extended or adjusted under 35 U.S.C. 154(b) by 549 days.

(21) Appl. No.: 13/058,213

(22) PCT Filed: Aug. 14, 2008

(86) PCT No.: PCT/CN2008/071993
§ 371 (c)(1),
(2), (4) Date: Jun. 1, 2001

(87) PCT Pub. No.: WO2010/017677
PCT Pub. Date: Feb. 18, 2010

(65) Prior Publication Data
US 2011/0220242 A1    Sep. 15, 2011

(51) Int. Cl.
*B65D 88/64*    (2006.01)
*B65B 57/10*    (2006.01)
*B65B 1/06*    (2006.01)
*B65B 37/02*    (2006.01)

(52) U.S. Cl.
USPC ............................. 141/69; 141/286; 241/25

(58) Field of Classification Search
USPC ............... 141/69, 71, 72, 73, 74, 77, 78, 285, 141/286; 222/63, 64, 65, 226; 414/147, 414/160, 161, 288, 293, 294
See application file for complete search history.

(56) References Cited

U.S. PATENT DOCUMENTS

| 3,823,881 | A |   | 7/1974 | Grob |
|---|---|---|---|---|
| 4,347,876 | A | * | 9/1982 | Morgan ........................ 141/70 |
| 4,399,846 | A | * | 8/1983 | De Souza Dias et al. ..... 141/192 |
| 5,102,055 | A | * | 4/1992 | Buschmann et al. ............. 241/5 |
| 5,288,028 | A | * | 2/1994 | Spivak et al. .................. 239/683 |
| 6,105,888 | A | * | 8/2000 | Goehner et al. ................... 241/5 |
| 6,145,517 | A | * | 11/2000 | Mancuso ..................... 134/22.1 |
| 6,457,659 | B1 | * | 10/2002 | Yang et al. ................... 241/24.1 |
| 8,393,361 | B2 | * | 3/2013 | Luchinger et al. .............. 141/83 |

FOREIGN PATENT DOCUMENTS

| CN | 2521172 | 11/2002 |
|---|---|---|
| CN | 2751005 | 1/2006 |
| CN | 1986351 | 6/2007 |
| GB | 2330353 A | 4/1999 |
| JP | 58125533 | 7/1983 |
| JP | 6063384 | 3/1994 |

* cited by examiner

*Primary Examiner* — Timothy L Maust
*Assistant Examiner* — Brandon J Warner
(74) *Attorney, Agent, or Firm* — Whyte Hirschboeck Dudek S.C.

(57) ABSTRACT

Agglomerated fine solids, e.g., agglomerated pellets (2B), that are located within a restricted space or pinch point of a conveyance system (1), and that impede the free-flow of fine solids from one vessel (4) to another vessel (10), are detected and fragmented through the coordinated use of a flow detector (12), breaker plate (8) and press (6). The flow detector (12) senses an interruption or diminishment in the flow of the fine solids and signals and actuates the press (6) which in turn engages and fragments the agglomeration. The breaker plate (8) is sized and configured to trap major agglomerates.

18 Claims, 6 Drawing Sheets

FRAGMENTATION OF AGGLOMERATED FINE SOLIDS

FIELD OF THE INVENTION

The present invention relates generally to material unloading and conveying systems. In one aspect, the invention relates to a system for the conveyance of free flowing fine solids from a first vessel to a second vessel while in another aspect, the invention relates to such a system equipped with means for fragmenting agglomerated fine solids that clog the system. In still another aspect, the invention relates to a method of removing clogs of agglomerated fine solids from a system that conveys fine solids from one vessel to another vessel.

BACKGROUND OF THE INVENTION

Many applications exist in which fine solids, e.g., pellets, are unloaded and conveyed using a gravity feed system. One such application is found in cable manufacturing in which polymeric resin is used for the manufacture of one or more sheaths that protect the conducting core. These resins are typically delivered to the manufacturing plant in the form of pellets, transferred to a holding and/or feed hopper, and then transferred under the force of gravity from the holding hopper to a conveying pipe. Alternatively, the pellets are delivered in large bags or sacks from which they are discharged into the conveying pipe, typically through an intermediate hopper that funnels the pellets into the pipe. The pellets are then conveyed through the pipe under any suitable force, e.g., auger screw, pneumatic pressure, etc., to an extruder from which molten resin is extruded onto a wire or cable in the form of a sheath.

While agglomeration of fine solids, particularly polymeric fine solids, can occur under many different conditions, agglomeration is particularly troubling during the transfer of fine solids from a relatively large space to a relatively small space. For example, the transfer of fine solids from a storage bin, large feed hopper or sack that can contain hundreds, if not thousands, of pounds of fine material, to a receptacle that usually contains less than a hundred pounds of material at any one time, e.g., an extruder, usually involves the passage of the fine material through a narrowed or tapered section of the hopper that acts as a funnel for directing the flow of the material into a conveying receptacle or vessel, e.g., a pipe, for transfer of the fine material to processing equipment. During the passage of the fine material through this tapered section of the equipment, the individual particles of the material experience increased pressure and a tendency to bind or agglomerate with the individual particles in which they are in contact. Certain resins, e.g., crosslinked polyethylene (XLPE), a common material in the manufacture of insulation coverings for wire and cable, are more prone to such agglomeration than others, particularly under extreme temperatures, e.g., the heat experienced in a non-air-conditioned or limited air-conditioned manufacturing facility located in a tropical or subtropical climate during the summer, or the cold experienced in a non-heated or limited heated manufacturing facility located in a northern climate during the winter.

If the agglomerations are small enough, they can pass through the system from storage bin or holding hopper to extruder without disruption of the overall process. Large agglomerations, however, can and often do disrupt the overall process by clogging narrow or pinch points in the system. The downstream equipment that relies on a steady feed of fine solids from the feed vessel may not be timely alerted to the reduction or cessation of flow through the system which in turn can result in unacceptable fluctuations in the dimensions and/or quality of the final product. Moreover, removing the agglomerations from the system can be exceedingly difficult, and it may introduce contaminates into the material-in-process.

BRIEF SUMMARY OF THE INVENTION

In one embodiment the invention is a system for the conveyance of free flowing fine solids from a first vessel to a second vessel, the system equipped with means for fragmenting agglomerates of fine solids that impede or block the free flow of fine solids from the first vessel to the second vessel, the system comprising:

A. A first vessel for receiving and discharging free-flowing fine solids, the first vessel comprising a narrow discharge section through which the free-flowing fine solids pass;

B. A breaker plate located in or beneath the discharge section of the first vessel such that fine solids passing from the first vessel to the second vessel must pass through the plate, the plate comprising a grid-like structure of interconnected blades that form holes that extend through the plate, the holes sized and configured such that the free-flowing fine solids can pass through the plate;

C. A second vessel with an inlet for receiving the fine solids from the first vessel;

D. A flow detector located above or within or about the inlet of the second vessel such that fine solids entering the second vessel through the inlet must pass by or through the flow detector, the flow detector designed and equipped to sense the movement of the fine solids by or through it and comprising a signal emitter for transmitting a signal that the flow of fine solids has been diminished below a pre-determined flow rate or stopped; and E. A press for fragmenting agglomerates that are located in the discharge section of the first vessel and on or closely above the top facial surface of the breaker plate, the press located above and about the top facial surface of the breaker plate and comprising (1) a press arm, the press arm comprising a press head, (2) a signal receiver for receiving the signal transmitted by the signal emitter of the flow detector, and (3) means for activating the press arm to compress and fragment the agglomerates upon receiving the signal from the flow detector such that the fragments pass through the breaker plate and the free flow of fine solids is restored.

The fine solids are typically in the form of pellets, the first vessel is typically a hopper and the second vessel is typically a pipe. The inlet to the pipe is typically an open end of the pipe. The flow detector can be any device that can detect the flow, or lack of or diminished flow, of fine solids, e.g., a light detector, capacitance detector, etc., and the press arm can be actuated by compressed air, hydraulic fluid, etc. Additionally, the press may be comprised of an actuating mechanism that delivers an abrupt dispersion of an inert gas upon one or more sides of the agglomeration.

In another embodiment the invention is a system for the conveyance of free flowing crosslinked polyethylene (XLPE) pellets from a bag to a pipe, the system equipped with means for fragmenting agglomerates of XLPE pellets that impede or block the free flow of XLPE pellets from the bag to the pipe, the system comprising:

A. A bag for holding and discharging free-flowing XLPE pellets, the bag comprising a discharge opening through which the free-flowing XLPE pellets pass;

B. An intermediate vessel positioned beneath the bag to receive the discharged XLPE pellets and in which the XLPE agglomerates collect and impede or block the discharge from the bag of the XLPE free-flowing pellets;

C. A breaker plate located in or beneath the intermediate vessel such that pellets passing from the bag to the pipe must pass through the plate, the plate comprising a grid-like structure of interconnected blades that form holes that extend through the plate, the holes sized and configured such that the XLPE free-flowing pellets can pass through the plate, the blades comprising edges extending towards or into the bag;

D. A pipe with an inlet for receiving the XLPE pellets from the intermediate vessel;

E. A flow detector located above the inlet of the pipe, or within or about the pipe, such that XLPE pellets entering the pipe through the inlet or having entered the pipe are passing through it, must pass by or through the flow detector, the flow detector designed and equipped to sense the movement or lack of movement of the XLPE pellets by or through it and comprising a signal emitter for transmitting a signal that the flow of XLPE pellets is diminished below a pre-determined flow rate or stopped;

F. A press for fragmenting XLPE agglomerated pellets that are located in the intermediate vessel and on or closely above the top facial surface of the breaker plate, the press located above and about the top facial surface of the breaker plate and comprising a (1) press arm, the press arm comprising a press head, (2) a signal receiver for receiving the signal transmitted by the signal emitter of the flow detector, and (3) means for activating the press arm to compress and fragment the XLPE agglomerate pellets upon receiving the signal from the flow detector such that the fragments pass through the breaker plate and free flow of the XLPE pellets is restored; and G. An extruder for receiving and processing the XLPE free-flowing pellets from the pipe.

The system may be equipped with one or more additional signal receivers that can receive signals from the flow detector signal emitter such that when the free flow of XLPE pellets is diminished or blocked, other parts of the system, e.g., the extruder, can adjust accordingly. The bag is typically a flexible, durable shipping bag in which the pellets are shipped from manufacturer to user, and it is typically suspended over the intermediate vessel such that pellets flow out the bag through the discharge opening and into the intermediate vessel, which is typically a hopper.

In another embodiment the invention is a method for fragmenting agglomerated fine solids that are located within a restricted space and are impeding or blocking the free flow of fine solids from one vessel to another vessel, the method comprising the steps of:

A. Detecting the presence of agglomerated fine solids that are within a restricted space and that are impeding or blocking the free flow of pellets from a first vessel to a second vessel, the presence of the agglomerated fine solids detected by an interruption of or diminishment in the flow of fine solids from the first vessel to the second vessel;

B. Sending a signal of the presence of the agglomerated fine solids to a means for fragmenting the agglomerated fine solids, the means located in or about the restricted space; and C. Actuating the means for fragmenting the agglomerated fine solids to engage and fragment the agglomerates such that the agglomerates cease the diminishment in or blockage of the flow of the fine solids from the first vessel to the second vessel.

The means for fragmenting the agglomerated fine solids is typically a press comprising a press arm and press head, and the press can be actuated in any conventional manner, e.g., pneumatically, hydraulically, etc. The signal regarding the presence of the agglomerated solids can also be used to regulate other parts of the system.

DETAILED DESCRIPTION OF THE PREFERRED EMBODIMENT

Figure 1A:
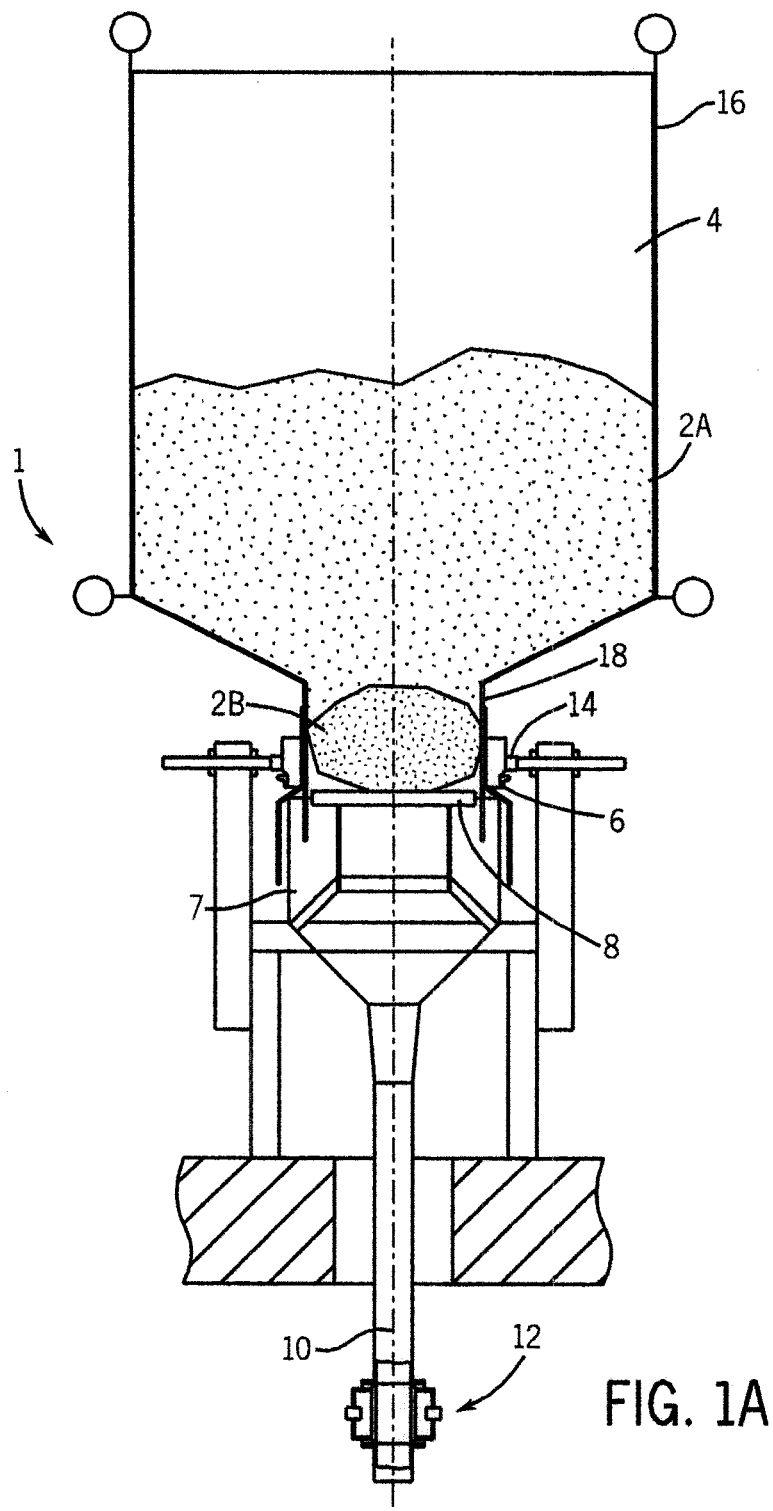
FIG. 1A is a side view of a conveyance system comprising a hopper and a pipe, the system equipped with means for fragmenting agglomerated fine solids.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, equipment dimensions, pellet size, hole size, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

Numerical ranges are provided within this disclosure for, among other things, the size of the fine solids and the holes in the breaker plate.

"Fine solids" and like terms mean solids in particulate form, e.g., in the form of pellets, granules, flakes, powders, etc. The composition of the fine solids can vary widely, and includes both organic and inorganic materials such as polymeric resins, minerals and agricultural and food products. In the context of this invention, the size of the fine solids is typically in the range of 0.1 to 6, more typically in the range of 1 to 4.

"Flow", "flowing", "free flowing" and like terms mean to move along in a stream. In the case of fine solids, flow is illustrated by the pouring of salt, dry sand or polymer pellets through an opening, e.g., a spout, of a container holding such fine solids. In the context of this invention, flow is typically induced and sustained by gravity, but other forms of energy or force can be used, e.g., that resulting from the use of a pump.

"Agglomerate" and like terms mean a plurality of individual fine solids clumped or otherwise together forming a single mass.

"Minor agglomerate" and like terms mean an agglomerate that will pass through a hole or holes of a breaker plate under the influence of gravity and the weight of the fine solids above it. Minor agglomerates include both agglomerates smaller than the average size of the cross-section of the holes in the breaker plate, and agglomerates larger than the average size of the cross-section of the holes in the breaker plate but sufficiently loosely bound that they fragment into pieces smaller than the average size of the cross-section of the holes in the breaker plate under the influence of gravity and the weight of the fine solids above it.

"Major agglomerate" and like terms mean an agglomerate that is larger in size than the size of the cross-section of the holes in the breaker plate, and that will not pass through the holes of a breaker plate simply under the influence of gravity and the weight of the fine solids above it.

"Hole" and like terms mean an open passage or channel in the breaker plate through which a fine solid can pass.

"Facial surface" and like terms are used in distinction to edge surfaces and like terms. A cylindrically shaped pellet or breaker plate comprises two facial surfaces joined by one continuously curved edge surface. A rectangular breaker plate comprises two facial surfaces joined by four edge surfaces with the surface area of either facial surface typically much greater than the surface area of any one edge surface. The facial surfaces of the breaker plate are not solid, but rather grid-like, i.e., the facial surfaces consist of an arrangement of intersecting blades that form holes that allow for the passage of fine solids through the plate.

Although the following description of the invention is in the context of a system for conveying XLPE pellets from a holding or feed hopper or sack to an extruder, the invention may be applied to other systems in which agglomerated fine solids can accumulate and block or otherwise impede the flow of free-flowing fine solids from one vessel to another vessel. Various items of equipment such as electrical and pneumatic connections, fittings and the like have been selectively omitted so as to simplify the drawings. Additionally, like reference numerals are used to indicate like components throughout the drawings.

Figure 3A:
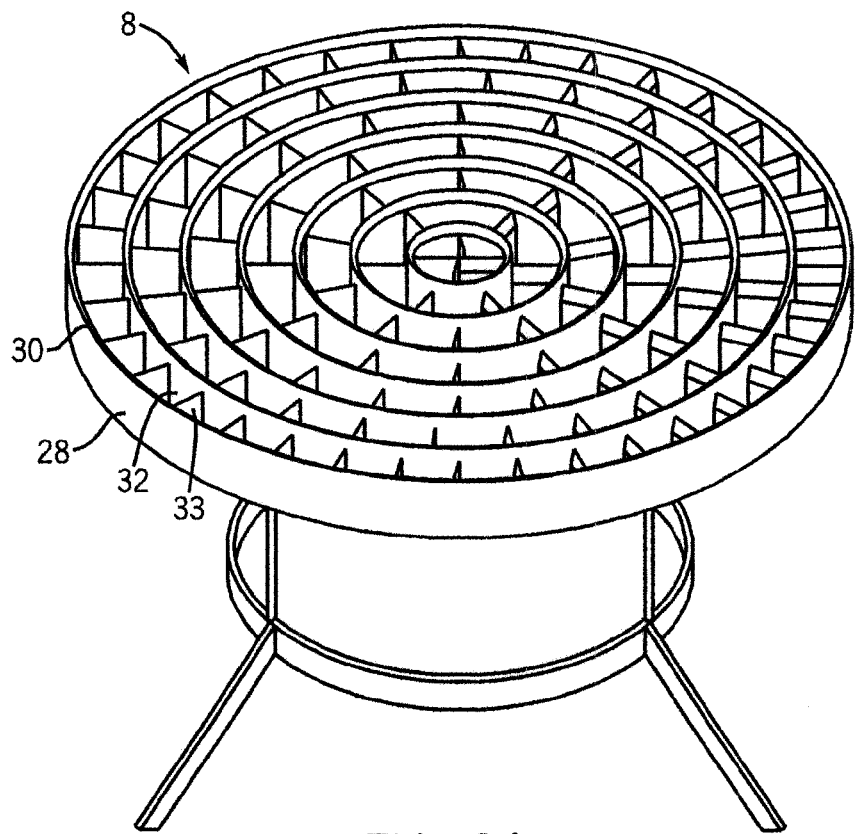
FIG. 3A is a perspective view of the breaker plate of FIG. 2B.

FIG. 1A depicts one embodiment of the invention in which conveyance system 1 is equipped with means for fragmenting agglomerated pellets. Conveyance system 1 comprises hopper 4, press 6, an intermediate hopper 7, breaker plate 8, pipe 10, and flow detector 12. In general, nonagglomerated pellets 2A flow via gravity from hopper 4 into intermediate hopper 7, through the breaker plate, and into the pipe for transport to an extruder (not shown). As the pellets flow through the pipe, they pass before the flow detector which measures the flow of the pellets from the hopper into the pipe. As the pellets contact the breaker plate, they are separated and/or de-agglomerated by circular blades 28 and intersecting blades 33 (FIG. 3A). This action facilitates an even and steady flow of pellets from hopper 4 to pipe 10 and onto the extruder.

Agglomerated pellets 2B interrupt, or at least diminish, the flow of free-flowing pellets 2A from hopper 4 to pipe 10 and when the flow is sufficiently disrupted, this is sensed by flow detector 12. At this time, the flow detector sends a signal to press 6 that actuates press arms 14 to compress agglomerated pellets 2B sufficiently to fragment them into pieces and/or nonagglomerated pellets 2A that will pass through the holes of breaker plate 8 and restore the desired flow of pellets from hopper 4 to pipe 10. Once flow is restored and sensed by the flow detector, a signal is sent from the flow detector to cease actuation of the press arms.

The size and configuration of the holes in breaker plate 8 are largely dependent on the size and configuration of pellets 2A. Although pellets 2A may take any convenient shape, e.g., a half-sphere, the pellets are typically wafer or cylindrically shaped with substantially flat facial surfaces. In regards to the present embodiment, the typical dimensions of cylindrical XLPE pellets are a diameter or cross-section of 1 to 5 millimeters (mm).

Referring again to FIG. 1A, intermediate hopper 7 can be sized and configured to not only receive pellets from hopper 4 for transfer to pipe 10, but it can also be sized and configured to eliminate hopper 4, i.e., it can be sized and configured to at least temporarily house pellets 2A until the pellets are ready for transfer to processing equipment, e.g., an extruder. In this configuration breaker plate 8 is typically situated within the tapered section of intermediate hopper 7 or, less preferably, between the intermediate hopper and the pipe or within the inlet or front section of the pipe, and pellets 2A is transferred directly from the intermediate hopper to the pipe.

Hopper 4 comprises top section 16 extending downwards towards a tapered or funnel-shaped discharge section 18. Intermediate hopper 7 is similarly configured. The cross-sectional configuration of both the top and discharge sections of the hoppers can vary to convenience, but typically both sections have a cylindrical cross-section. Likewise, the size of both hoppers can vary widely, and it is usually determined by the needs of the process.

Figure 2A:
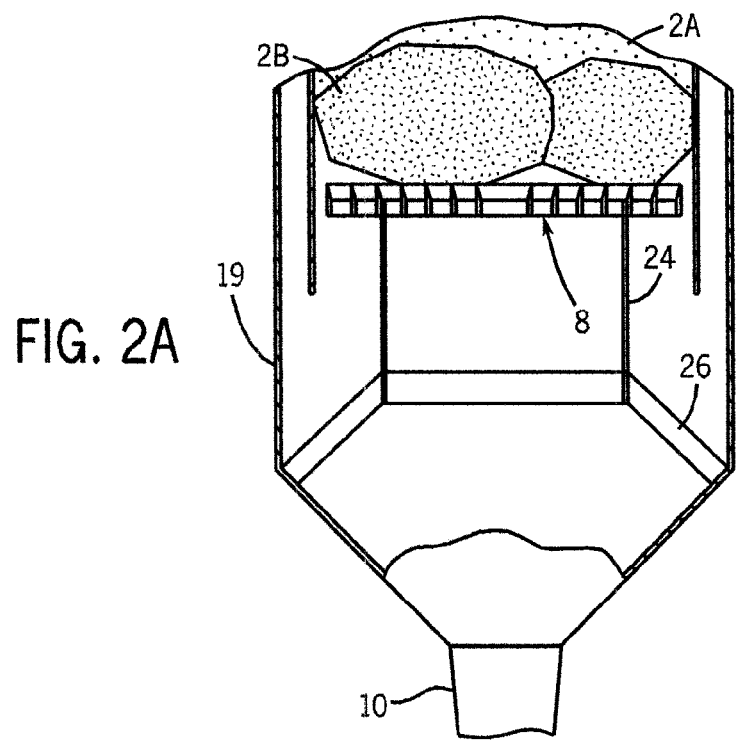
FIG. 2A is an enlarged section of FIG. 1A showing the bottom section of the hopper and agglomerates position atop of a breaking plate.
Figure 2B:
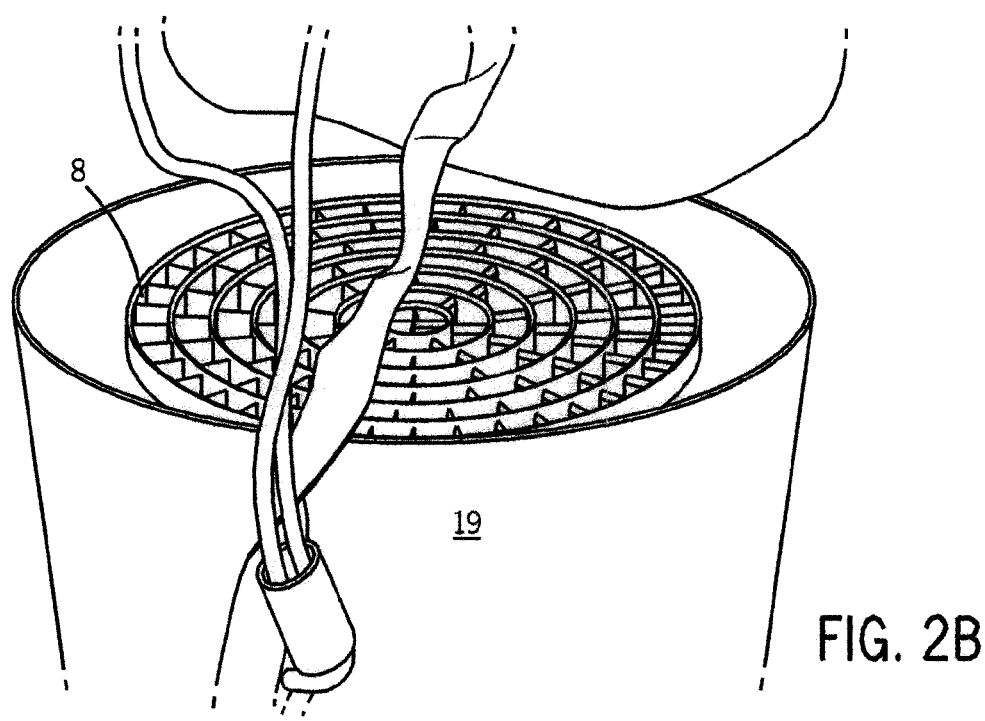
FIG. 2B is a perspective view of the hopper of FIG. 1B with a breaker plate situated within it.

In reference to FIG. 2A, breaker plate 8 is shown mounted substantially inside the top section of intermediate hopper 7. Funnel-shaped discharge section 18 of hopper 4 is shown extending into intermediate hopper 7 such that it encircles the breaker plate and thus channels pellets 2A directly onto the top facial surface of the breaker plate. Various mounting configurations may be used to situate breaker plate 8 within intermediate hopper 7, and the embodiment of the figures comprises support arms 24 with one end secured to breaker plate 8 and the other end secured to frame base 26. The frame base can be secured to the intermediate hopper by any suitable means, e.g., welding. The mounting configuration, i.e., support arms 24 and frame base 26, is designed to occupy a minimal amount of space within the intermediate hopper so as to provide the least resistance to pellets 2A as they flow through it. The figures also show breaker plate 8 mounted perpendicular to the flow of pellets 2A, although the breaker plate may be mounted at another angle so long as the pellets can easily access the holes of the breaker plate. The breaker plate, support arms and frame base are typically constructed from stainless steel to provide optimal cleanliness, but other materials, e.g., other metals, engineering plastics, etc., may also be used in their construction.

Figure 3B:
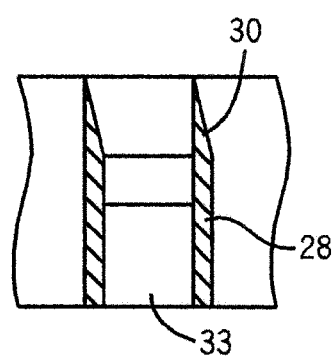
FIG. 3B is an enlarged side view of the circular blades of the breaker plate of FIG. 3A.
Figure 3C:
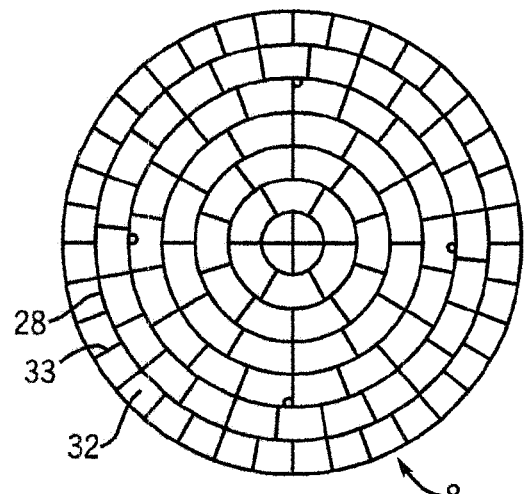
FIG. 3C is a top view of the breaker plate of FIGS. 2A, 2B and 3A.

FIGS. 3A-3C show further details of breaker plate 8. More particularly, FIG. 3A shows the breaker plate further comprised of a plurality of circular blades 28 and intersecting blades 33 configured such that a plurality of breaker holes 32 is formed. Referring to FIG. 3B, both the circular and intersecting blades each have a blade edge 30.

FIG. 3C is a top view of breaker plate 8, more particularly showing the orientation of circular blades 28, intersecting blades 33 and breaker holes 32. In this embodiment breaker plate 8 is configured as a series of concentric circular blades 28 joined by intersecting blades 33 by any suitable means, e.g., arc welding, to form a plurality of breaker holes 32. In this particular embodiment breaker plate 8 includes seven concentric circular blades 28 joined at their perimeters by substantially straight intersecting blades 33. The intersecting blades may or may not extend the full height of the circular blades.

Although only one breaker plate configuration is discussed and shown, various other plate configurations may be used. For example, the plate may have an overall polygonal configuration, and/or the intersecting blades meet the circular or linear blades at an angle other than 90 degrees, and the like. The dimensions of the blades are typically in the range of 1 to 5 mm in thickness and 5 to 50 mm in length. The part of the blade that first encounters the pellet typically has a sword edge configuration (as shown in FIG. 3B), but other configurations are possible, e.g., frustro-conical, pin, pyramidal, etc. In another embodiment, breaker plate 8 may be formed from a press plate that has been punched to form breaker holes, with the punched material attached to the plate and extending upward towards the hopper to form the blades or shards.

The size of breaker hole 32 is determined in large part by the size of the pellets that are to pass through it. Typically, the size or cross-sectional area of a hole is one-third to one-sixth of the size of the cross-sectional area of the inside of pipe 10. In a circular configuration, typically the dimensions of the breaker holes increase with respect to increased proximity to the center of breaker plate 8, although the breaker holes have substantially the same dimensions and configuration within each radial section. In other embodiments, the dimensions and configurations of each individual breaker hole can also vary. The typical configuration of the breaker holes 32 is as shown in the figures, and the typical dimensions are 10 to 40 mm in diameter or cross-section and 5 to 50 mm in depth.

The manner in which the breaker plate is made and the materials from which it is constructed are not critical to this invention. Typically the breaker plate is constructed from stainless steel, and is assembled using arc welding but in applications that require very low levels of metal contamination, e.g., the use of polyethylene to make a sheath for an extra high voltage cable, the breaker plate can be made from another material, e.g., an engineering plastic, and assembled using a technique other than arc welding, e.g., the use of an adhesive.

Generally, as pellets 2A flow from hopper 4 onto breaker plate 8, the pellets are pressed downward against blade edges 30 by the gravitational forces on the pellets. Additionally, the use of pneumatic and/or mechanical assists can be employed to increase the downward pressure on the pellets. Under the downward pressure, minor agglomerations of pellets 2A are separated into individual pellets by the cutting action of the blades, and these pellets, along with the nonagglomerated pellets 2A, flow through breaker holes 32 into pipe 10. Due to various reasons, such as temperature and the weight of the pellets above the pellets near or on the top of the breaker plate, major agglomerations 2B may be formed (as shown in FIG. 2A). These agglomerations can impede, if not completely block, the flow of pellets through the breaker plate and into pipe 10.

Figure 3D:
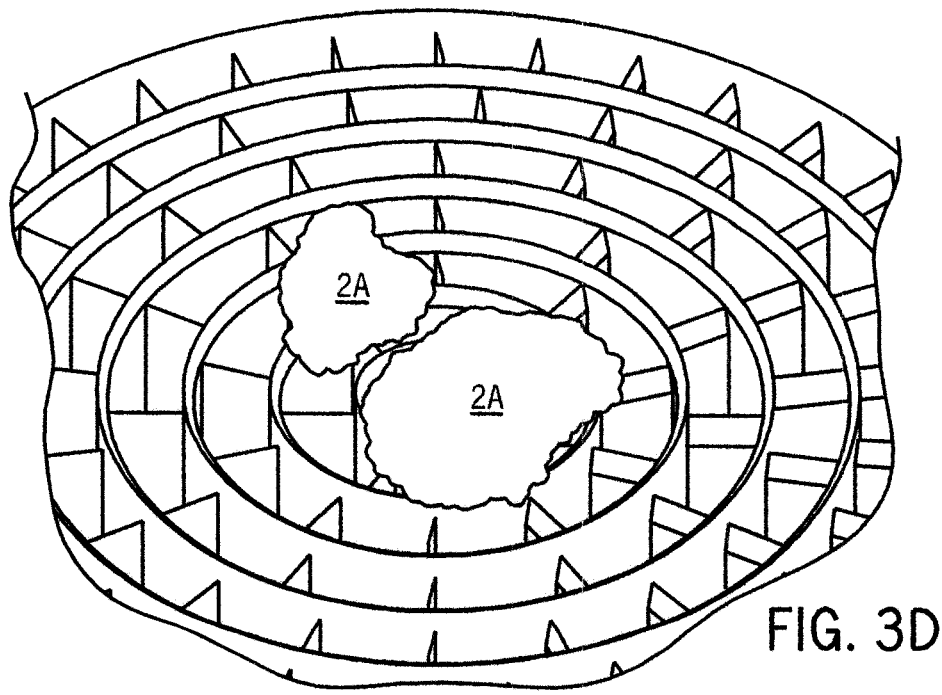
FIG. 3D is a perspective view of a portion of the breaker plate of FIGS. 2A-B, 3A and 3C with a representative minor agglomeration of pellets resting upon it.

Referring to FIG. 3D, breaker plate 8 is shown with an agglomeration of pellets 2A situated upon it. The agglomerations depicted may be considered minor agglomerations as other pellets would likely pass through the breaker holes 32 around them to provide sufficient flow of pellets 2A to pipe 10. Further, although the agglomerations are shown in isolation on breaker plate 8, in practice the weight of the other pellets in hopper 4 would be pushing down upon them. The downward pressure from these other pellets will promote fracture of the agglomerations against the blades of the plate, and the fractured agglomerations will then pass through the breaker holes. Alternatively, if the agglomerations do not fracture under the weight of pellets above them and the agglomerations shown are sufficient to substantially block the flow of the pellets to the pipe, then they constitute major agglomerations and require press 6 to be actuated to fracture them.

Figure 4A:
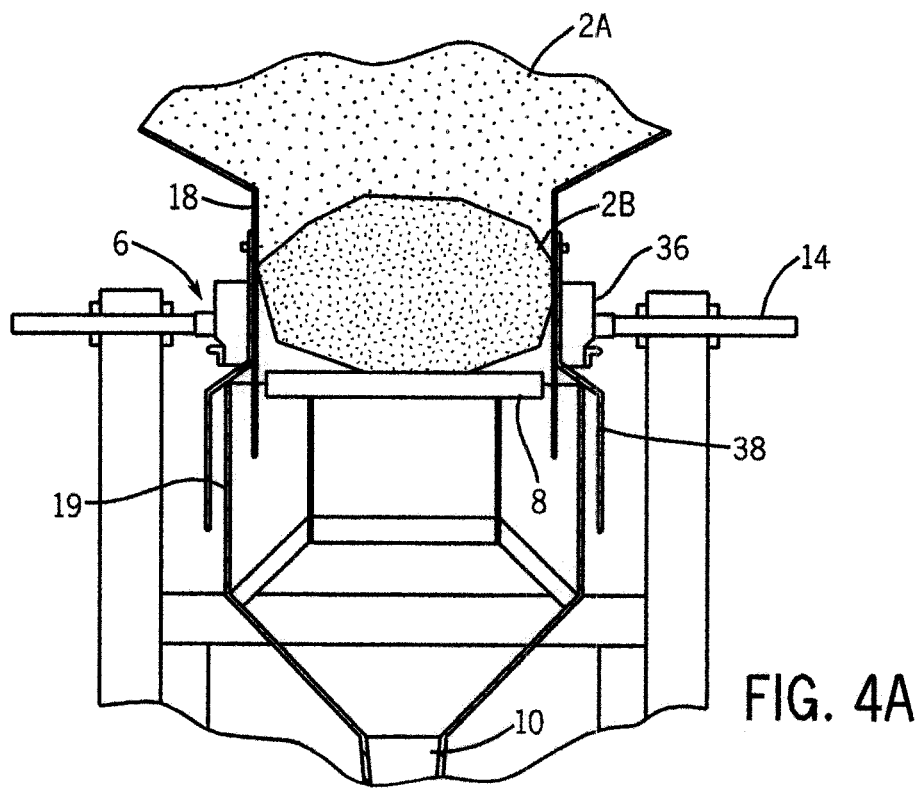
FIG. 4A is another enlarged side view of FIG. 1A showing a press.

FIG. 4A is an enlarged view of intermediate hopper 7 that includes press 6 and breaker plate 8. The press includes press arms 14, and each press arm further comprises a press head 36 situated at the end of the arm nearest the pellets. FIG. 4A shows two press heads, and each is semi-circular in shape (not shown) and positioned on substantially opposing sides of flexible hopper bottom 18 and just above the top surface of breaker plate 8. The semi-circular shape of press head 36 is configured to align with circular bottom 18 and circular breaker plate 8, the shape of one typically configured to accommodate the shape of the other.

Figure 4B:
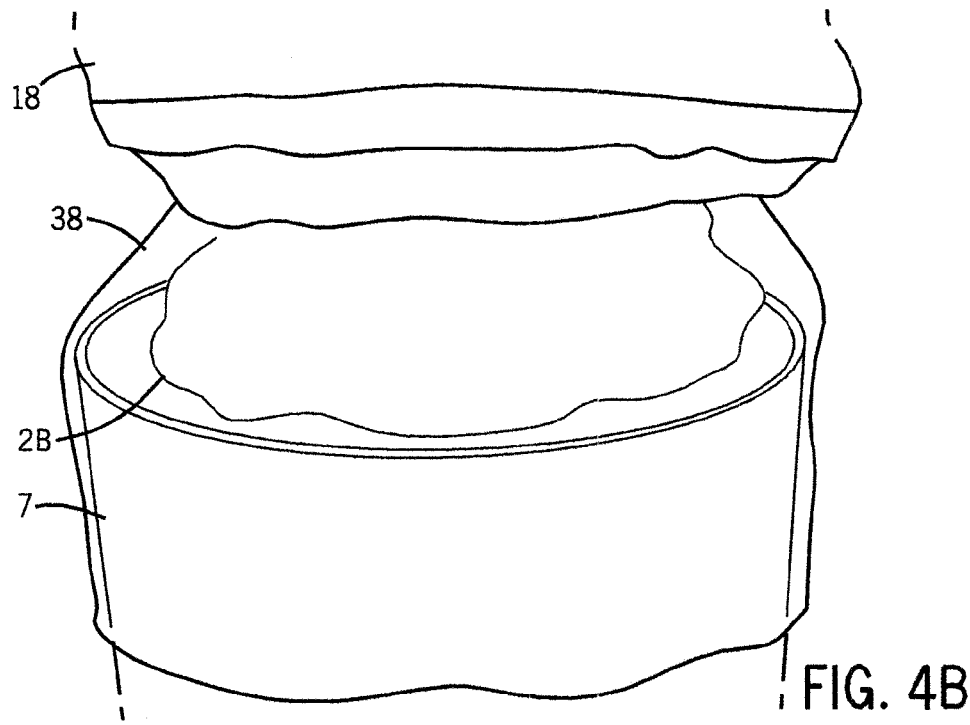
FIG. 4B is a perspective view of a conveyance system comprising a hopper, a breaker plate, a flexible barrier with a representative major agglomerate resting upon the top surface of the breaker plate.

Press arms 14 are actuated by any suitable means, e.g., pneumatically, hydraulically, etc., such that each is moved inward above the top of breaker plate 8, towards major agglomeration 2B (such as shown in FIG. 4B). This inward movement compresses not only the agglomeration, but also lower section 18 of hopper 4 (which, in this embodiment, is in the form of a flexible sack or bag) and flexible barrier or curtain 38 (described below). Press 6 imparts sufficient compressive force to major agglomerates 2B that they fragment into pieces sufficiently small so as to pass through breaker holes 32 of breaker plate 8. The compressive force necessary to fragment major XLPE agglomerates is typically between 2 and 20 kilograms per foot (kgf). The press arm displacement during compression, i.e., the movement of press head 36 from rest to extended, is typically between 30 and 100 mm. Press arms 14 are retracted either when they have reached a predetermined extension or load limit as detected by an appropriate sensor (not shown).

FIG. 4A also shows flexible barrier 38 that is situated between press heads 36 and lower section 18 of hopper 4, and thus indirectly, the pellets 2A (and agglomerations 2B). The flexible barrier is typically in the form of a durable film or curtain that will prevent or minimize spillage of the pellets as they pass from hopper 4 into intermediate hopper 7, particularly if a clog occurs on the top of breaker plate 8. Typically, the flexible barrier is constructed from the same material as that of the pellets, e.g., XLPE, although other types of durable isolating barriers can be used, e.g., those made of nylon or polyester. FIG. 4B shows one embodiment of the flexible barrier extending downward and over the outside of the intermediate hopper.

Figure 1B:
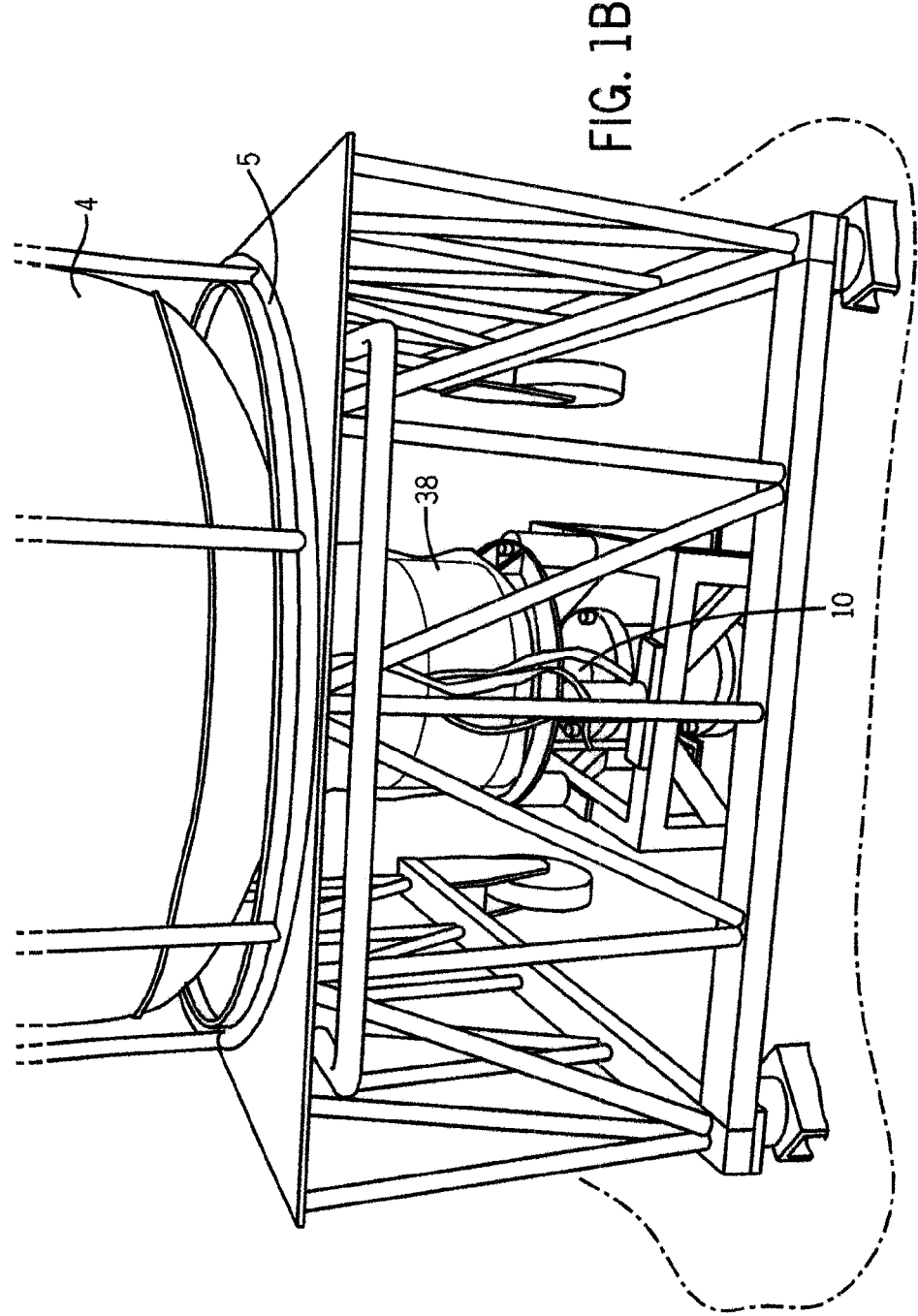
FIG. 1B is a perspective view of at least one embodiment of a conveyance system comprising a shipping sack of pellets, a support frame for the sack, a hopper, a flexible barrier, and a pipe.

As discussed above, hopper 4 may be comprised of various materials and configured in various shapes and in the embodiment shown in FIG. 1B, hopper 4 is a sack or bag comprised of a flexible, durable material pre-filled with pellets 2A. In the process of removing the pellets, the bag is secured to a support frame 5 such that the pellets may flow out of an open end of the bag under the force of gravity. The bag may have a fill-opening and a discharge-opening, or the bag may have a single opening through which it is both filled and emptied. If the latter, then the bag is typically inverted for discharge of the pellets. Flexible barrier 38 may be secured about the discharge-opening of the bag to avoid spillage of pellets during their flow from hopper 4 to intermediate hopper 7. The flexible barrier at least partially encloses the intermediate hopper.

Figure 5:
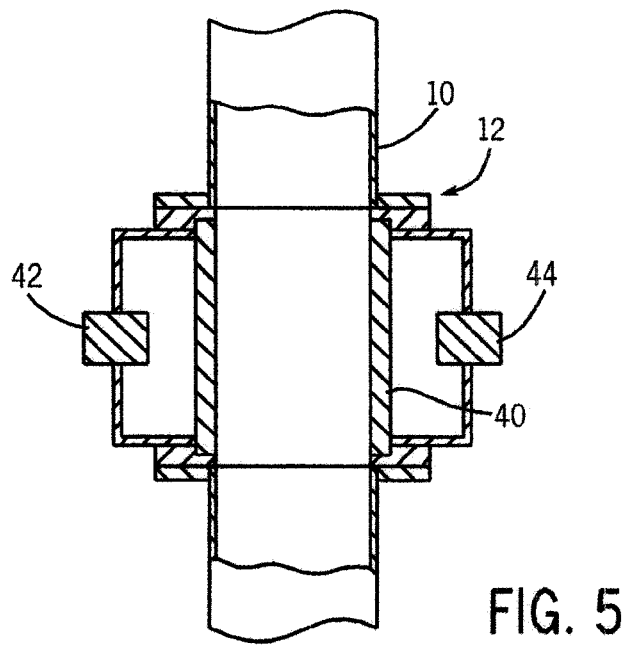
FIG. 5 is another enlarged side view of FIG. 1A showing a section of pipe equipped with a light detector.

FIG. 5 shows pipe 10 having a section 40 with flow detector 12 situated adjacent to it. Section 40 of the pipe is typically situated near the open end of the pipe through which pellets enter from the intermediate hopper. Section 40 may be transparent, semi-transparent or opaque, and it may simply be a length of the pipe like most, if not all, other sections of the pipe. Whatever its construction, it is designed to facilitate, or at least not impair, the operation of the flow detector in sensing the flow of pellets through the pipe. Various methods of flow detection, such as light scattering, induction, capacitance, sonar, etc., can be used. In FIG. 5 flow detector 12 includes light emitter 42 situated on one side of section 40, and light detector 44 situated opposite light emitter 42.

In operation, flow detector 12 measures the flow of pellets 2A through pipe 10. The detection of a reduced or stopped flow of the pellets by the flow detector actuates press 6 to fragment agglomeration 2B. In the present embodiment, to facilitate activation of the press, the flow detector and the press communicate via a programmable logic controller (not shown); although in other embodiments this control may be executed by various other devices, such as integrated or discrete relays. As many processes are highly dependent on a minimum continuous flow of free-flowing pellets 2A to ensure product quality, flow detector 12 may also communicate with one or more other process controllers (not shown) to slow or halt a downstream process, e.g., the operation of the extruder, when the flow of the pellets is detected to be below a minimum rate.

Although the invention has been described in considerable detail by the preceding examples and references to the drawings, this detail is for the purpose of illustration and is not to be construed as a limitation upon the spirit and scope of the invention as it is described in the appended claims. All patents and publications cited above, specifically including for U.S. practice all U.S. patents, allowed patent applications and U.S. Patent Application Publications, are incorporated herein by reference.

What is claimed is:

1. An apparatus for conveying free flowing fine solids from a first vessel to a second vessel, the system equipped with means for fragmenting agglomerates of fine solids that impede or block the free flow of fine solids from the first vessel to the second vessel, the system comprising:
   A. A first vessel for receiving and discharging free-flowing fine solids, the first vessel comprising a narrow discharge section through which the free-flowing fine solids pass;
   B. A breaker plate located in or beneath the discharge section of the first vessel such that fine solids passing from the first vessel to the second vessel must pass through the plate, the plate comprising a grid-like structure of interconnected blades that form holes that extend through the plate, the holes sized and configured such that the free-flowing fine solids can pass through the plate;
   C. A second vessel with an inlet for receiving the fine solids from the first vessel;
   D. A flow detector located above or within or about the inlet of the second vessel such that fine solids entering the second vessel through the inlet must pass by or through the flow detector, the flow detector designed and equipped to sense the movement of the fine solids by or through it and comprising a signal emitter for transmitting a signal that the flow of fine solids has been diminished below a pre-determined flow rate or stopped; and
   E. A press for fragmenting agglomerates that are located in the discharge section of the first vessel and on or closely above the top facial surface of the breaker plate, the press located above and about the top facial surface of the breaker plate and comprising (1) a press arm, the press arm comprising a press head, (2) a signal receiver for receiving the signal transmitted by the signal emitter of the flow detector, and (3) means for activating the press arm to compress and fragment the agglomerates upon receiving the signal from the flow detector such that the fragments pass through the breaker plate and the free flow of fine solids is restored.

2. The apparatus of claim 1 in which the first vessel is a hopper and the second vessel is a pipe.

3. The apparatus of claim 2 in which the hopper is a flexible, durable sack.

4. The apparatus of claim 3 in which the flow detector measures pellet flow by light scatter.

5. The apparatus of claim 4 in which a barrier film is position between the press head and the discharge section of the hopper.

6. The apparatus of claim 5 in which the breaker plate comprises a series of circular, concentric blades joined at their perimeters by a series of interconnecting blades.

7. The apparatus of claim 6 in which the holes of the breaker plate are between one-third and one-sixth the cross-sectional area of the cross-sectional area of the pipe.

8. The apparatus of claim 1 further comprising means for controlling the signal between the flow detector and press.

9. A system for the conveyance of free flowing crosslinked polyethylene (XLPE) pellets from a bag to a pipe, the system equipped with means for fragmenting agglomerates of XLPE pellets that impede or block the free flow of XLPE pellets from the bag to the pipe, the system comprising:
   A. A bag for holding and discharging free-flowing XLPE pellets, the bag comprising a discharge opening through which the free-flowing XLPE pellets pass;
   B. An intermediate vessel positioned beneath the bag to receive the discharged XLPE pellets and in which the XLPE agglomerates collect and impede or block the discharge from the bag of the XLPE free-flowing pellets;
   C. A breaker plate located in or beneath the intermediate vessel such that pellets passing from the bag to the pipe must pass through the plate, the plate comprising a grid-like structure of interconnected blades that form holes that extend through the plate, the holes sized and configured such that the XLPE free-flowing pellets can pass through the plate, the blades comprising edges extending towards or into the bag;
   D. A pipe with an inlet for receiving the XLPE pellets from the intermediate vessel;
   E. A flow detector located above the inlet of the pipe, or within or about the pipe, such that XLPE pellets entering the pipe through the inlet or having entered the pipe are passing through it, must pass by or through the flow detector, the flow detector designed and equipped to sense the movement or lack of movement of the XLPE pellets by or through it and comprising a signal emitter for transmitting a signal that the flow of XLPE pellets is diminished below a pre-determined flow rate or stopped;

F. A press for fragmenting XLPE agglomerated pellets that are located in the intermediate vessel and on or closely above the top facial surface of the breaker plate, the press located above and about the top facial surface of the breaker plate and comprising a (1) press arm, the press arm comprising a press head, (2) a signal receiver for receiving the signal transmitted by the signal emitter of the flow detector, and (3) means for activating the press arm to compress and fragment the XLPE agglomerate pellets upon receiving the signal from the flow detector such that the fragments pass through the breaker plate and free flow of the XLPE pellets is restored; and G. An extruder for receiving and processing the XLPE free-flowing pellets from the pipe.

10. The system of claim 9 in which the bag is a flexible, durable shipping bag in which the XLPE pellets are shipped from a manufacturer of the XLPE pellets to a user of the XLPE pellets, and the shipping bag is suspended over the intermediate vessel before the discharge of the XLPE pellets from the bag to the intermediate vessel.

11. The system of claim 10 in which the intermediate vessel has a hopper configuration.

12. The system of claim 11 further comprising a flexible, plastic curtain encircling and extending from the discharge opening of the bag to and encircling at least a part of the intermediate vessel such that XLPE pellets discharged from the bag are funneled into the intermediate vessel with minimal spillage.

13. The system of claim 12 in which the flexible plastic curtain comprises polyethylene film.

14. The system of claim 13 in which the polyethylene film is also positioned between the bag and the press head.

15. The system of claim 14 in which the breaker plate comprises a series of concentric rings joined at their perimeters by a series of interconnecting blades.

16. The system of claim 15 in which the holes of the breaker plate are between one-third and one-sixth the cross-sectional area of the cross-sectional area of the pipe.

17. The system of claim 16 in which the flow detector measures pellet flow by light scattering.

18. The system of claim 17 further comprising means for controlling the signal between the flow detector and press.

* * * * *